April 5, 1955 H. H. ARNOLD 2,705,421
TEST POSITION GYRO MOUNT
Filed Dec. 30, 1948 2 Sheets-Sheet 1
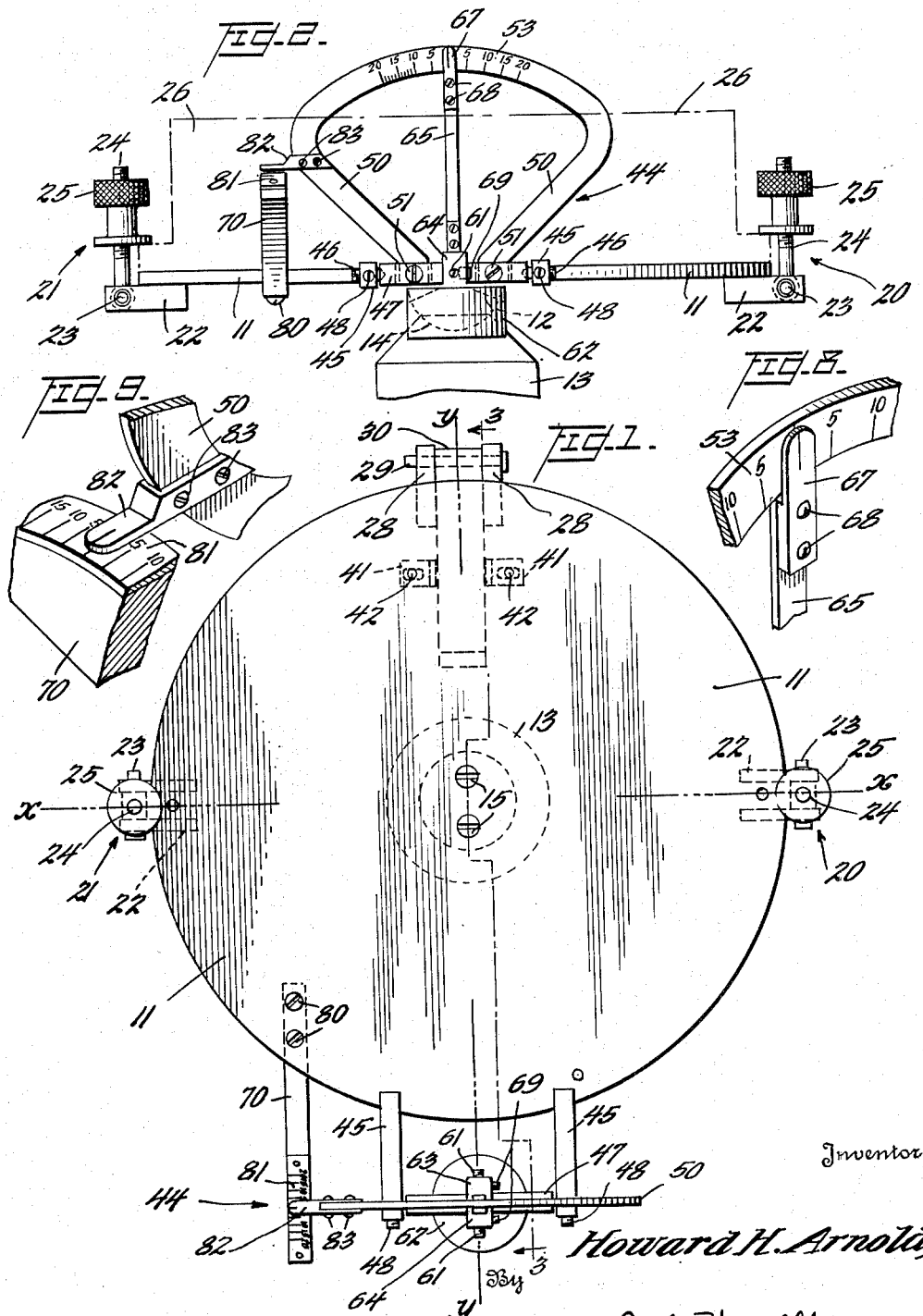
Inventor
Howard H. Arnold,
C. B. Hamilton
ATTORNEY

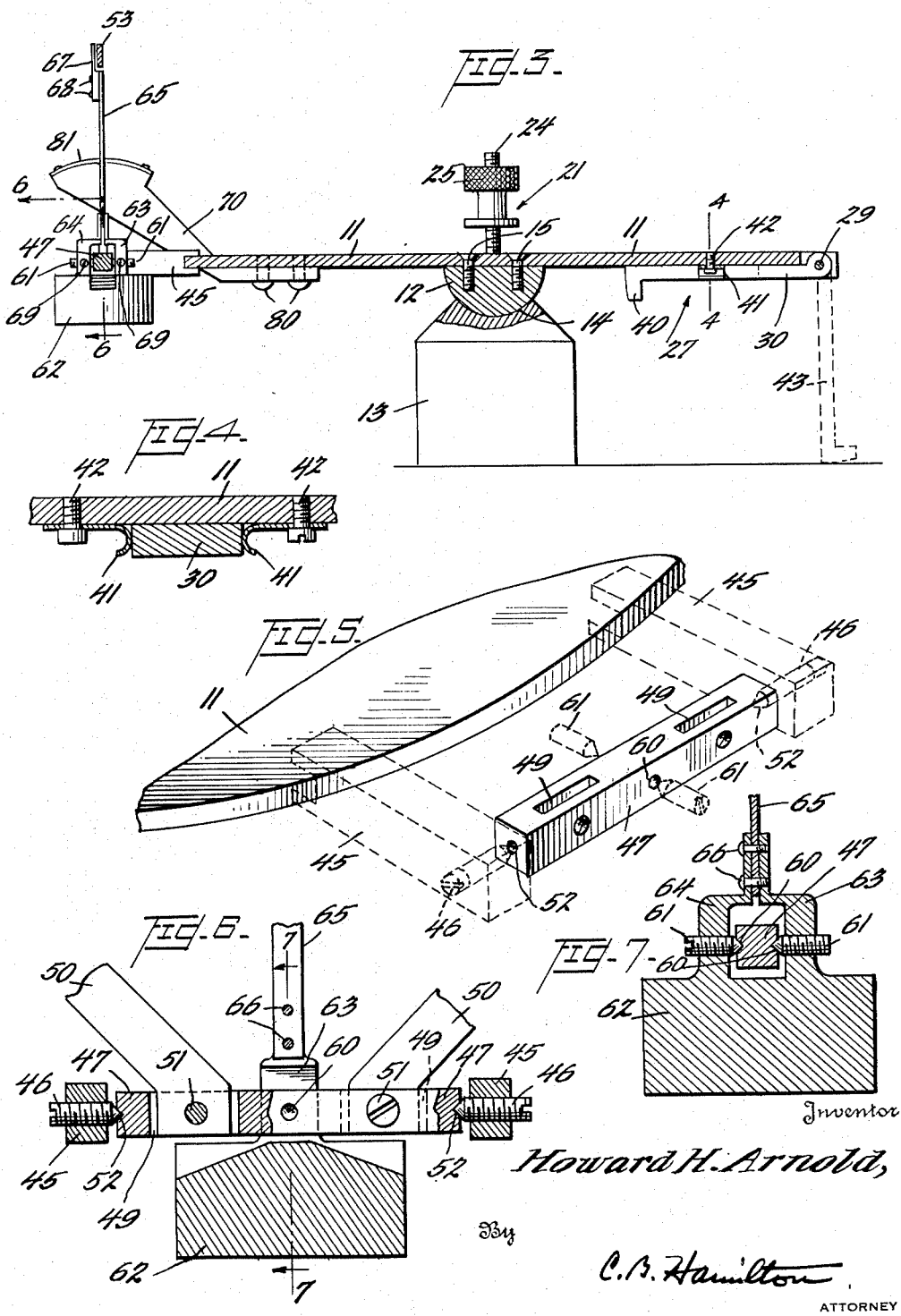

United States Patent Office 2,705,421
Patented Apr. 5, 1955

2,705,421
TEST POSITION GYRO MOUNT

Howard H. Arnold, Winston-Salem, N. C., assignor to Western Electric Company, Incorporated, New York, N. Y., a corporation of New York Application December 30, 1948, Serial No. 68,317

6 Claims. (Cl. 73—66)

This invention relates to testing apparatus and more particularly to testing apparatus for measuring the unbalance of gyroscopic mechanisms.

In the manufacture of gyrocompasses, gyrostabilizers, and other related gyroscopic mechanisms, it is necessary to check the alignment and rotative balance of the completed assembly. Since any errors in alignment and balance must be corrected while the mechanism is in operation, it is essential that the testing fixture be such that continuous readings of the off-balance conditions are available throughout the adjusting operation. In the past, considerable difficulty has been experienced in using or adapting the existing test equipment to achieve such a result.

Accordingly, an object of this invention is to provide a testing mount for gyroscopic mechanisms wherein any deviation from a desired normal position is instantly measured by a plurality of indicating devices.

With this and other objects in view, the invention comprises a test position table which is universally movable in a magnetic cup and ball joint and which is provided with a plurality of scales and pointers to indicate any table deflection about mutually perpendicular axes thereof. The table is also provided with a snap-down leg for holding the table in a horizontal position and a pair of hold-down lugs for positioning the article to be tested.

Other objects and advantages will be apparent from the following detailed description considered in conjunction with the accompanying drawings wherein Fig. 1 is the top plan view of a testing apparatus embodying the invention;

Fig. 2 is a front elevation view of the apparatus showing the relative positions of a plurality of scales thereon for measuring unbalance;

Fig. 3 is a sectional view taken along line 3—3 of Fig. 1;

Fig. 4 is a fragmentary sectional view taken along line 4—4 in Fig. 3 showing a holding means for a kick-down support leg;

Fig. 5 is an enlarged fragmentary perspective view of a scale and pointer supporting means shown at the left end of Fig. 3;

Fig. 6 is an enlarged sectional view of the scale and pointer securing means taken along the line 6—6 in Fig. 3;

Fig. 7 is a side sectional view of a counterweight and the supporting means therefor taken along the line 7—7 of Fig. 6;

Fig. 8 is an enlarged fragmentary view of a vertical scale and pointer shown in Fig. 2; and Fig. 9 is an enlarged fragmentary view of a horizontal scale and pointer shown in Fig. 1.

Referring now to the drawings, attention is first directed to Figs. 1, 2 and 3 which illustrate a table 11 supported by a bearing 12 and a base member 13. The base member 13 is affixed to any supporting surface such as a table or dolly top. In the upper extremity of the base member 13 is a concave or socket depression 14 in which the arcuate bearing 12 is positioned. The bearing 12 is secured to the table 11 by the screws 15 as shown in Fig. 3. The base 13 is a permanent magnet composed of any magnetic retentive material such as Alnico, and the bearing 12 is produced from any material such as steel which is susceptible to magnetic attraction. Because of the magnetic attraction between the magnetic base 13 and the steel bearing 12, the table 11 is free to deflect in any direction on the base 13.

Positioned directly opposite each other on axis X—X (Fig. 1) of the table 11 are two hold-down lug assemblies 20 and 21. Each lug assembly consists of a pair of supporting bars 22 which are welded to the underside of the table 11 and have apertures through which a bolt 23 passes. One end of a threaded arm 24 is pivotally mounted on the bolt 23 and the opposite end is provided with a thumb screw 25 which cooperates with the threaded portion of the arm 24. The thumb screws 25 as shown in Fig. 2 are tightened down on any extending portions of a gyroscopic mechanism 26, shown in dotted outline, which is to be tested, so as to hold the mechanism 26 in a proper position on the table 11.

At one end of an axis Y—Y (Fig. 1) of the table 11 is affixed a snap-down supporting leg assembly 27. The leg assembly 27 includes a pair of supporting bars 28 which are welded to the under side of the table 11, and a bolt 29 which passes through openings in the bars 28. One end of the snap-down leg 30 is pivotally mounted on the bolt 29 and the other end is provided with a footed portion 40 (Fig. 3). The leg 30 is held in its raised or non-operative position as shown in Figs. 3 and 4 by a pair of spring detent members 41 which are secured to the under side of the table 11 by a pair of machine screws 42. When the leg 30 is lowered as indicated in dotted outline at 43 in Fig. 3, the footed portion 40 firmly positions the table 11 in a horizontal position so that the mechanism 26 may be positioned and secured thereon. When the actual test is being performed the leg 30 is held in its raised non-operative position by the spring members 41.

An indicating assembly 44 is positioned on an edge of the table 11 directly opposite the kick-down leg 30. The assembly 44 is supported by a pair of arms 45 (Fig. 1) which have a bifurcated end welded to the upper and lower surface of the table 11. A pair of bearing screws 46 (Fig. 6) extend transversely through the opposite end of the arms 45 to engage a pair of depressions 52 which are formed in opposite ends of an arm 47. The arms 45 are also provided with a pair of set screws 48 (Fig. 2) which are threaded longitudinally of the arms 45 to contact the bearing screws 46. The screws 46 are adjusted to engage the depressions 52 to form a pair of bearings about which the arm 47 may pivot. The perpendicularly extending set screws 48 are tightened to hold the bearing screws 46 in an adjusted position.

The arm 47 has two vertically extending slots 49 (Fig. 6) into which are secured the ends of an arcuate scale support 50. The support 50 and the arm 47 are rigidly secured together by screws 51. The upper arcuate extremity of the support 50 carries the scale 53 (Figs. 2 and 3) which is graduated to a 20 degree deflection in both a clockwise and counterclockwise direction from the 0 degree center point. The arm 47 is also provided with a pair of conical depressions 60 (Figs. 5, 6 and 7) which are positioned opposite each other on longitudinal side surfaces of the arm 47.

A bifurcated counterweight 62 is suspended on the arm 47 by two bearing screws 61 which are threaded through two vertical projections 63 and 64 of the counterweight 62 so as to engage the depressions 60 on the arm 47. A pair of set screws 69 (Fig. 3) extend through the projections 63 and 64 perpendicularly to the length of the screws 61 and are used to hold the screws 61 in an adjusted position. A pointer arm 65 is secured between the two upright projections 63 and 64 by a pair of screws 66 (Fig. 7). The arm 65 extends vertically upward from the counterweight 62 so that a clear plastic pointer 67 which is secured to an upper extremity of the arm 65 by a pair of screws 68 cooperates with the scale 53. The scale 53 and the pointer 67 are arranged so that the pointer 67 coincides with the zero deflection mark on the scale 63 only when the table 11 is free from any tilting deflection about its axis Y—Y.

A second scale support 70 (Figs. 1, 2 and 3) is secured to the under side of the table 11 by a pair of screws 80. An arcuate scale 81 is secured to an upper extremity of the support 70 so as to lie parallel to the axis Y—Y of the table 11. The scale 81 (Fig. 9) is graduated to show a 20 degree deflection about a zero degree center point in both a clockwise and counterclockwise direction in the movement of the table about its X—X axis. A second clear plastic pointer 82 is secured to the scale support 50 by a pair of screws 83 so that the pointer 82 will coincide with the zero deflection center point of the scale 82 only when the table 11 is not deflected about its lateral axis X—X.

The description of the method of measuring the off-balance of the table 11 and consequently of the gyroscopic mechanism 26 is facilitated by recalling the geometrical principle that motion about a fixed point may be resolved into two components of deflection measured about two axes which are perpendicular to each other. In this embodiment of the invention, the table 11 is free to move about the fixed base member 13 so that any movement of the table 11 may be resolved into components of deflection about the mutually perpendicular axes of the table, X—X and Y—Y.

The deflection of the table 11 about its axis Y—Y is measured by the pointer 67 and the scale 53. The counterweight 62 maintains the scale support 50 and the pointer arm 65 in a normal vertical position by means of the pivotal motion of the arm 47 about the screws 46, whose axis of rotation is parallel to the axis X—X. When the table 11 moves about the axis Y—Y, the arm 47 is also rotated an equal amount about the same axis. However, the pointer arm 65 and the pointer 67 remain vertical due to the pivotal action of the screws 61 whose axis of rotation is parallel to that of the axis Y—Y. Since the scale 53 is rotated the same amount as the table 11 and since the pointer 67 remains in the same position, the pointer 67 will give indication on the scale 53 of the amount of rotation of the table 11 in either a clockwise or counterclockwise direction about the axis Y—Y.

The scale 81 and the pointer 82 are used to indicate the deflection of the table 11 about its axis X—X. The scale 81 being rigidly secured to the table 11 will move through the same turning motion about the axis X—X as the table 11, and since its cooperating pointer 82 is secured to the scale support 50 which is maintained in a constantly vertical position in the manner hereinbefore described, the deflection of the table will be indicated on the scale 81 by the pointer 82. Although the two measurements have been explained individually, it is easily seen that both measurements will be indicated simultaneously on the two scales 53 and 81.

From the foregoing detailed description, it is now believed that the operation of the testing mount will be understood. In order to prepare the mount for accurate operation, the bearing screws 46 are adjusted to engage the depressions 52 with just enough friction to allow the arm 47 complete freedom of rotation. After the bearing screws 46 are adjusted, the set screws 48 are tightened against the screws 46 to hold them firmly in the adjusted position. The bearing screws 61 are then adjusted to engage the depressions 60 to allow the counterweight 62 and the pointer arm 65 to pivot freely about the arm 47. The set screws 69 are then tightened to firmly hold the bearing screws 61 into their adjusted position.

The leg 30 is pivoted away from the spring holding means 41 so that the footed portion 40 contacts the supporting table surface. Since the leg 30 and the base 13 and bearing 12 are equal in vertical height, the table 11 is held in a horizontal position. The pointer 67 and 82 now read zero deflection on the scales 53 and 81. The gyro mechanism 26 is now positioned on the table 11 and the thumb screws 25 are tightened down on any extending portion of the gyro mechanism 26 so as to hold it on the table in a proper position for testing.

The gyro mechanism 26 comprises a gyro case tiltably mounted on a gyroscope (not shown) and an electrical position responsive element, not shown but well known in the art, associated with the gyro case and the gyroscope. The gyroscope axis assumes a vertical orientation when the gyroscope is energized. The relative position of the gyro case with respect to the vertical axis of the gyroscope is indicated by the electrical position responsive element. The indication of the electrical position responsive element is electrically adjusted to correspond to the reading of the scales 53 and 81 at various positions of the table 11.

The gyro mechanism 26 under test is then energized to place the mechanism in operation and the leg 30 is raised into engagement with the spring detents to be held thereby. If the gyro mechanism 26 is out of adjustment the table 11 will be moved about the base 13 and the bearing 12 to produce a certain degree of deflection from the normal horizontal position. The deflection produced is indicated on the scales 53 and 81 by the pointers 67 and 82, respectively. The gyro mechanism 26 is then adjusted by the operator until both of the pointers 67 and 82 coincide with the zero deflection point on the scales 53 and 81. When this condition is obtained the table 11 has returned to a normal horizontal position thus indicating that the gyro mechanism 26 has been adjusted to a balanced operating point. Also the testing apparatus may be used where it is desired to set a certain degree of off-balance in the mechanism 26 and this is achieved by merely adjusting the gyro mechanism 26 until the desired degree of deflection, indicating the off-balance, is shown on the scales 53 and 81.

It is to be understood that the above described arrangements are simply illustrative of the application of the principles of the invention and that numerous other arrangements may be readily devised by those skilled in the art which will embody the principles of the invention and fall within the spirit and scope thereof.

What is claimed is:

1. A dynamic balance testing mount for gyro mechanisms comprising a magnetic base member, magnetically susceptible bearing means universally movable in the base in a ball and socket arrangement, means secured to the bearing means for supporting a gyro mechanism under test while in full operation, and means mounted on the supporting means for simultaneously indicating deflection of the supporting means about mutually perpendicular axes thereof, said magnetic base member and said magnetically susceptible bearing means stabilizing by magnetic attraction the universal movement of the mechanism supporting means.

2. A dynamic balance testing mount comprising a magnetic base member, magnetically susceptible bearing means universally movable on the base member in a ball and socket arrangement, means mounted on said bearing means for supporting a mechanism under test, a first calibrated means pivotally mounted on said mechanism supporting means, a counterweight pivotally secured to the calibrated means to maintain the first calibrated means in a vertical position, a first indicating means secured to the counterweight, said first indicating means cooperating with the first calibrated means to measure the deflection of the mechanism supporting means about a first axis, a second calibrated means secured to the mechanism supporting means, and a second indicating means secured to the first calibrated means for cooperating with the second calibrated means to measure deflection of the mechanism supporting means about a second axis.

3. A dynamic balance testing apparatus for gyro mechanisms comprising a magnetic base member, a magnetically susceptible bearing means universally movable in the base member in an inherently stable ball and socket arrangement, mechanism supporting means secured to the bearing means, and means mounted on the mechanism supporting means for indicating deflection of the mechanism supporting means about mutually perpendicular axes thereof.

4. An apparatus for testing a gyroscopic mechanism comprising a magnetic base member, a magnetically susceptible bearing means universally movable in the base member in a ball and socket arrangement, supporting means secured to the bearing means, means for securing the gyroscopic mechanism to the supporting means, quickly adjustable means for holding the supporting means in a horizontal position, and means mounted on the supporting means for indicating deflection of the supporting means about mutually perpendicular axes thereof.

5. An apparatus for testing a gyroscopic mechanism comprising a magnetic base member, a magnetically susceptible bearing means universally movable in the base member in a ball and socket arrangement, a table secured to the bearing means, a plurality of hold-down lugs for securing the gyroscopic mechanism to the table, a snap-down leg for quickly adjusting the table to a horizontal position, and a plurality of means mounted on the table for indicating deflection of the table about mutually perpendicular axes thereof.

6. An apparatus for testing a gyroscopic mechanism comprising a base member of magnetic material, a bearing member of magnetically susceptible material, said base member having a socket portion and said bearing member having a ball portion which together form a ball and socket arrangement so that said bearing member is universally movable in said base member with said base member stabilizing by magnetic attraction the universal movement of the bearing member therein, means secured to the bearing member for supporting the mechanism under test while in full operation, and means mounted on the supporting means for simultaneously indicating deflection of the supporting means about mutually perpendicular axes thereof.

References Cited in the file of this patent

UNITED STATES PATENTS

| | | |
|---|---|---|
| 1,091,708 | Riddell | Mar. 31, 1914 |
| 1,258,597 | Mladinich | Mar. 5, 1918 |
| 1,343,751 | Simmons | June 15, 1920 |
| 1,386,128 | MacCordy | Aug. 2, 1921 |
| 2,110,343 | Taylor | Mar. 8, 1938 |
| 2,366,266 | Kallenbach | Jan. 2, 1945 |

FOREIGN PATENTS

| | | |
|---|---|---|
| 548,826 | Great Britain | Oct. 26, 1942 |